United States Patent
Liu et al.

(10) Patent No.: US 11,380,134 B2
(45) Date of Patent: Jul. 5, 2022

(54) METHOD AND DEVICE FOR DETERMINING PARAMETER FOR GAZE TRACKING DEVICE

(71) Applicant: BEIJING 7INVENSUN TECHNOLOGY CO., LTD., Beijing (CN)

(72) Inventors: Wei Liu, Beijing (CN); Jian Wang, Beijing (CN); Dongchun Ren, Beijing (CN); Fengmei Nie, Beijing (CN); Xiaohu Gong, Beijing (CN)

(73) Assignee: BEIJING 7INVENSUN TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 16/507,082

(22) PCT Filed: Dec. 7, 2018

(86) PCT No.: PCT/CN2018/119878
§ 371 (c)(1),
(2) Date: Mar. 28, 2020

(87) PCT Pub. No.: WO2019/128675
PCT Pub. Date: Jul. 4, 2019

(65) Prior Publication Data
US 2020/0226351 A1    Jul. 16, 2020

(30) Foreign Application Priority Data
Dec. 25, 2017 (CN) .......................... 201711429629.8

(51) Int. Cl.
*G06K 9/00* (2022.01)
*G06V 40/18* (2022.01)
(Continued)

(52) U.S. Cl.
CPC ......... *G06V 40/193* (2022.01); *G06K 9/6256* (2013.01); *G06V 40/19* (2022.01); *G06V 40/197* (2022.01); *G06V 40/20* (2022.01)

(58) Field of Classification Search
None
See application file for complete search history.

(56) References Cited

U.S. PATENT DOCUMENTS

| 6,603,491 B2 | 8/2003 | Lemelson et al. |
| 2008/0084539 A1 | 4/2008 | Daniel |

(Continued)

FOREIGN PATENT DOCUMENTS

| CN | 101436250 A | 5/2009 |
| CN | 103558909 A | 2/2014 |

(Continued)

OTHER PUBLICATIONS

Joshua B.Tenenbaum & William T.Freeman. "Separating Style and Content with Bilinear Models". Neural Computation. Dec. 31, 2000 (Dec. 31, 2000). vol. 12 No. 6. pp. 1247-1283.

(Continued)

*Primary Examiner* — Leon Viet Q Nguyen
(74) *Attorney, Agent, or Firm* — Gang Yu (57) ABSTRACT

The disclosure discloses a method and device for determining parameter for a gaze tracking device. The method includes that: an image to be detected and a characteristic matrix of the image to be detected are acquired; the image to be detected is processed according to a preset model to obtain a first vector and second vector of the image to be detected; and a parameter of the image to be detected is determined according to the first vector and the second vector, the parameter of the image to be detected including (Continued)

at least one of: a position of a glint in the image to be detected and a gaze direction of eyes in the image to be detected.

14 Claims, 4 Drawing Sheets

(51) Int. Cl.
*G06K 9/62* (2022.01)
*G06V 40/19* (2022.01)
*G06V 40/20* (2022.01)

(56) References Cited

U.S. PATENT DOCUMENTS

| | | | |
|---|---|---|---|
| 2008/0130950 A1* | 6/2008 | Miklos | G06F 3/013 382/103 |
| 2013/0070046 A1* | 3/2013 | Wolf | G06K 9/00617 348/14.16 |
| 2016/0063319 A1 | 3/2016 | Lee et al. | |
| 2016/0335475 A1* | 11/2016 | Krenzer | G06T 5/002 |
| 2019/0121427 A1* | 4/2019 | Qin | G06F 3/013 |

FOREIGN PATENT DOCUMENTS

| | | |
|---|---|---|
| CN | 103870796 A | 6/2014 |
| CN | 105094300 A | 11/2015 |
| CN | 106340051 A | 1/2017 |
| CN | 107067438 A | 8/2017 |
| CN | 107103293 A | 8/2017 |
| CN | 107357429 A | 11/2017 |
| CN | 108334810 A | 7/2018 |

OTHER PUBLICATIONS

Zhicai Ou et al. "A Bilinear Model Based Solution to Object Pose Estimation with Monocular Vision for Grasping". Proceedings of the 2011 IEEE International Conference on Mechatronics and Automation. Aug. 10, 2011 (Aug. 10, 2011). pp. 501-506.

* cited by examiner

|             | Reference 1 | Reference 2 | Reference 3 |     |
|-------------|-------------|-------------|-------------|-----|
| Viewing angle 1 | $z_{111}$<br>$z_{112}$<br>...<br>$z_{11n}$ | $z_{121}$<br>$z_{122}$<br>...<br>$z_{12n}$ | $z_{131}$<br>$z_{132}$<br>...<br>$z_{13n}$ | ... |
| Viewing angle 2 | $z_{211}$<br>$z_{212}$<br>...<br>$z_{21n}$ | $z_{221}$<br>$z_{222}$<br>...<br>$z_{22n}$ | $z_{231}$<br>$z_{232}$<br>...<br>$z_{23n}$ | ... |
| Viewing angle 3 | $z_{311}$<br>$z_{312}$<br>...<br>$z_{31n}$ | $z_{321}$<br>$z_{322}$<br>...<br>$z_{32n}$ | $z_{331}$<br>$z_{332}$<br>...<br>$z_{33n}$ | ... |
| Viewing angle 4 | $z_{411}$<br>$z_{412}$<br>...<br>$z_{41n}$ | $z_{421}$<br>$z_{422}$<br>...<br>$z_{42n}$ | $z_{431}$<br>$z_{432}$<br>...<br>$z_{43n}$ | ... |
| ... | ... | ... | ... | |

METHOD AND DEVICE FOR DETERMINING PARAMETER FOR GAZE TRACKING DEVICE

The present application claims benefit of Chinese Patent Application No. 201711429629.8, submitted to the Patent Office of the People's Republic of China on Dec. 25, 2017, and entitled "Method and device for determining parameter for gaze tracking device", the contents of which are hereby incorporated by reference in its entirety.

TECHNICAL FIELD

The embodiments of the disclosure relate to the field of gaze tracking, and particularly to a method and device for determining parameter for a gaze tracking device.

BACKGROUND

In a process of using an existing gaze tracking device, gaze estimation is mainly performed on, a remote device of a gaze point according to a Three-Dimensional (3D) approximately spherical model of an eyeball according to a coordinate of a pupil center of the eyeball and cornea reflection. When multiple cameras and multiple light sources are used, only a single point calibration can complete gaze estimation and match process of the light sources and glints. However, during a practical application, such a gaze estimation method is relatively complex in theoretical calculation. Moreover, since the light sources are not specific, the cameras at some positions may not capture images or may capture poor images, the glints may not be matched with the light sources, and a gaze direction may further not be determined, that is, gaze estimation may not be accurately performed.

For the problem of complex calculation of a gaze estimation algorithm and glint prediction algorithm for a gaze tracking device in a related art, there is yet no effective solution at present.

SUMMARY

According to the embodiments of the disclosure, a method for determining parameter for a gaze tracking device is provided, which includes that: an image to be detected and a characteristic matrix of the image to be detected are acquired; the image to be detected is processed according to a preset model to obtain a first vector and second vector of the image to be detected; and a parameter of the image to be detected is determined according to the first vector and the second vector, the parameter of the image to be detected including at least one of: a position of a glint in the image to be detected and a gaze direction of eyes in the image to be detected.

According to the embodiments of the disclosure, a device for determining parameter for a gaze tracking device is also provided, which includes: an acquisition component, configured to acquire an image to be detected and a characteristic matrix of the image to be detected; a determination component, configured to process the image to be detected according to a preset model to obtain a first vector and second vector of the image to be detected; and an estimation component, configured to determine a parameter of the image to be detected according to the first vector and the second vector, the parameter of the image to be detected including at least one of: a position of a glint in the image to be detected and a gaze direction of eyes in the image to be detected.

According to an embodiment of the disclosure, a storage medium is also provided, which includes a stored program, the program executes a method for determining parameter for a gaze tracking device.

According to an embodiment of the disclosure, a processor is also provided, which is configured to run a program, the program running to execute a method for determining parameter for a gaze tracking device.

According to an embodiment of the disclosure, a gaze tracking device is also provided, which includes a device for determining parameter for the gaze tracking device.

BRIEF DESCRIPTION OF THE DRAWINGS

The drawings described here are adopted to provide a further understanding to the disclosure and form a part of the disclosure. Schematic embodiments of the disclosure and descriptions thereof are adopted to explain the disclosure and not intended to form improper limits to the disclosure. In the drawings.

DETAILED DESCRIPTION OF THE EMBODIMENTS

In order to make those skilled in the art understand the solutions of the disclosure better, the technical solutions in the embodiments of the disclosure will be clearly and completely described below in combination with the drawings in the embodiments of the disclosure. It is apparent that the described embodiments are not all embodiments but only a part of the embodiments of the disclosure. All other embodiments obtained by those of ordinary skill in the art according to the embodiments in the disclosure without creative work shall fall within the scope of protection of the disclosure.

It is to be noted that terms "first", "second" and the like in the specification, claims and drawings of the disclosure are adopted not to describe a specific sequence or order but to distinguish similar objects. It should be understood that data used like this may be exchanged under a proper condition for implementation of the embodiments of the disclosure described here in sequences besides those shown or described herein. In addition, terms "include" and "have" and any transformation thereof are intended to cover non-exclusive inclusions. For example, a process, method, system, product or device including a series of steps or units is not limited to those clearly listed steps or units, but may include other steps or units which are not clearly listed or inherent in the process, the method, the system, the product or the device.

Embodiment 1

According to the embodiment of the disclosure, a method for determining parameter for a gaze tracking device is provided. It is to be noted that the steps shown in the flowchart of the drawings may be executed in a computer system like a set of computer executable instructions, and moreover, although a logic sequence is shown in the flowchart, the shown or described steps may be executed in a sequence different from that described here under some conditions.

Figure 1:
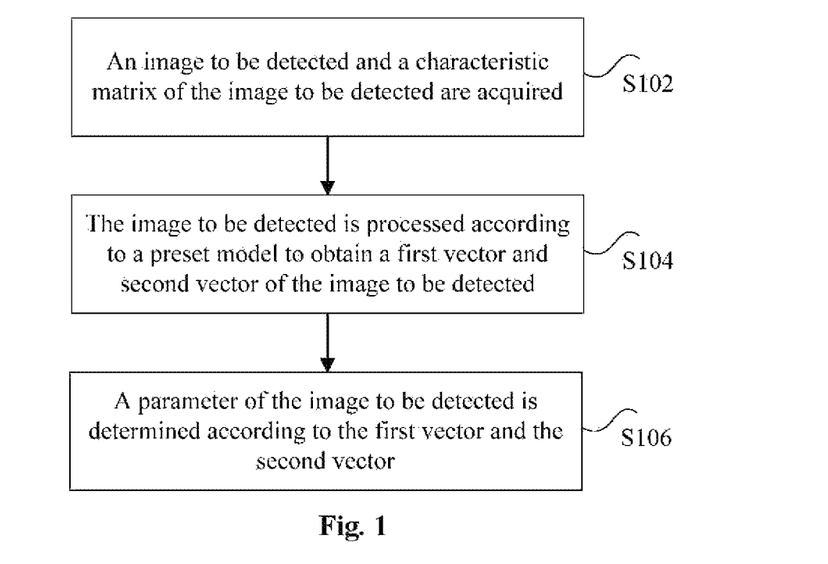
FIG. 1 is a flowchart of a method for determining parameter for a gaze tracking device according to an embodiment of the disclosure.

FIG. 1 is a flowchart of a method for determining parameter for a gaze tracking device according to an embodiment of the disclosure. As shown in FIG. 1, the method includes the following steps.

In S102, an image to be detected and a characteristic matrix of the image to be detected are acquired.

It is to be noted that the gaze tracking device in the disclosure includes, but not limited to, a Virtual Reality (VR) device, an Augmented Reality (AR) device, a Mixed Reality (MR) device and an intelligent terminal with a gaze tracking function, for example, a mobile phone, a computer and a wearable device (for example, 3D glasses).

In an optional embodiment, a camera is arranged in each of regions corresponding to a left eye and right eye in the gaze tracking device, that is, a left camera and a right camera are arranged, to acquire data of the left eye and the right eye respectively. Herein, an image acquired by the gaze tracking device is the image to be detected.

In S104, the image to be detected is processed according to a preset model to obtain a first vector and second vector of the image to be detected.

It is to be noted that the preset model may be, but not limited to, a bilinear model, for example, a bilinear model involved in a bilinear model training method introduced in Separating style and content with bilinear models. The image to be detected is taken as input of the preset model, and then output of the preset model is vectors, i.e., the first vector and the second vector, obtained by separating the data of the image to be detected. Herein, the first vector represents a vector in a certain reference space, and the second vector represents a vector in a certain viewing angle space.

In S106, a parameter of the image to be detected is determined according to the first vector and the second vector, the parameter of the image to be detected including at least one of: a position of a glint in the image to be detected and a gaze direction of eyes in the image to be detected.

It is to be noted that the image to be detected is decomposed into vectors in two dimensions of the reference space and the viewing angle space, the vectors in the two dimensions are processed respectively, and data operation is performed according to the decomposed first vector and second vector, so that effects of reducing data processing complexity and increasing an image data processing speed may be achieved.

From the solution defined by S102 to S106, it can be seen that the image to be detected and the characteristic matrix of the image to be detected are acquired, the image to be detected is processed according to the preset model to obtain the first vector and second vector of the image to be detected, and the parameter of the image to be detected is determined according to the first vector and the second vector, the parameter of the image to be detected including at least one of: the position of the glint in the image to be detected an the gaze direction of the eyes in the image to be detected.

It is apparent that the data of the image to be detected is decomposed into the first vector and the second vector according to the bilinear model, and since the first vector and the second vector are decomposed from the data of the image to be detected, when the first vector and the second vector are processed, data complexity is far lower than complexity in direct processing of the data of the image to be detected. That is, by such a process, an estimation algorithm for the gaze direction and/or the position of the glint in the image may be simplified, and the image data processing speed is further increased.

From the above, it can be seen that, according to the disclosure, a purpose of reducing complexity of a processing algorithm for the image to be detected may be achieved, so that a technical effect of increasing the image processing speed is achieved, and the technical problem of complex calculation of a gaze estimation algorithm and glint prediction algorithm for the gaze tracking device in the conventional art is further solved.

In an optional embodiment, before the operation that the image to be detected is processed according to the preset model, the preset model is required to be constructed, specifically including the following steps.

Figure 2:
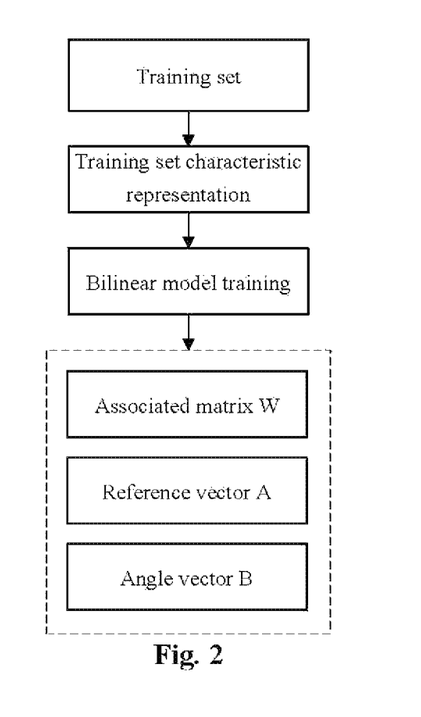
FIG. 2 is an optional flowchart of a method for training a preset model according to an embodiment of the disclosure.

In S202, multiple images to be trained are acquired.

In S204, the multiple images to be trained are processed to obtain a characteristic matrix of the multiple images to be trained.

In S206, the characteristic matrix of the multiple images to be trained is trained to obtain third vectors, fourth vectors and an correlation matrix.

Specifically, FIG. 2 is a flowchart of an optional method for training a preset model. From FIG. 2, it can be seen that, for training the preset model, it is necessary to obtain a training set from a database preset in the gaze tracking device, the training set including multiple human eye images in different reference spaces and different viewing angle spaces, namely the training set including the multiple images to be trained, perform training set characteristic representation on the human eye images in the obtained training set to obtain a characteristic matrix Z of the training set and perform model training on the obtained characteristic matrix to further obtain an correlation matrix W, reference vectors A and viewing angle vectors B, wherein $A=[a_1, \ldots a_s]$, $B=[b_1, \ldots, b_c]$, S represents the number of elements in the fourth vectors (i.e., the reference vectors A), C represents the number of elements in the third vectors (i.e., the viewing angle vectors B), the first vector is a vector in the reference vectors, and the second vector is a vector in the viewing angle vectors.

Figure 3:
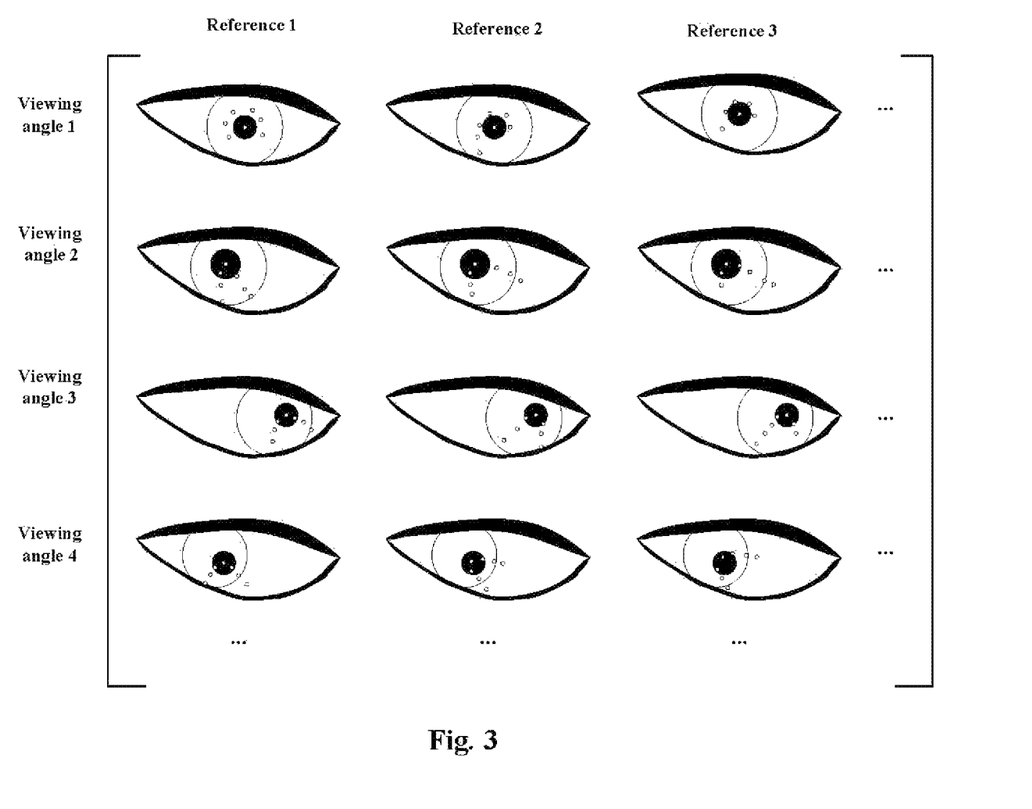
FIG. 3 is an optional schematic diagram of an image arrangement manner according to an embodiment of the disclosure.

In an optional embodiment, after the multiple images to be trained are obtained, the multiple images to be trained are arranged in a matrix form according to an image arrangement manner shown in FIG. 3. Herein, each column of the matrix represents images in different reference spaces, and each row represents images in different viewing angle spaces. For example, the first row represents images in a viewing angle 1 space, the first column represents images in a reference 1 space, the first column of the first row represents an image in at a viewing angle 1 in the reference 1 space, the second column of the first row represents an image at the viewing angle 1 in a reference 2 space, and the same arrangement manner is adopted for images at the viewing angle 1, a viewing angle 2, a viewing angle 3 and a viewing angle 4 in reference 2 and reference 3 spaces and will not be elaborated herein. After the multiple images to be trained are arranged, sampling processing is performed on each image. For example, a size of an initial image is 400×400, and a size of the sampled image is 20×20. After sampling processing of each image is completed, matrix transformation is performed on the sampled image, that is, an original n×m-dimensional image matrix is converted into an nm×1-dimensional image matrix. For example, if the number of dimensions of the sampled image matrix is 20×20, the number of dimensions of the image matrix obtained by matrix transformation is changed into 400×1. By such processing, the characteristic matrix, shown in FIG. 4, of the multiple images to be detected may be obtained, wherein $z_{ijk}$ represents a jth element in a viewing angle i and reference j space. For example, $z_{12n}$ represents an nth element in a viewing angle 1 and reference 2 space.

It is to be noted that, after the characteristic matrix of the multiple images to be trained is obtained, preset model training (for example, bilinear model training) may be performed on the characteristic matrix of the multiple images to be trained, thereby obtaining the third vectors (i.e., the viewing angle vectors B), the fourth vectors (i.e., the reference vectors A) and the correlation matrix, specifically including the following steps.

In S2060, the characteristic matrix of the multiple images to be trained is decomposed to obtain the third vectors.

In S2062, the characteristic matrix of the multiple images to be trained is transformed according to the third vectors to obtain a first characteristic matrix.

In S2064, the first characteristic matrix is decomposed to obtain the fourth vectors.

In S2066, the first characteristic matrix is transformed according to the fourth vectors to obtain a second characteristic matrix.

Inb S2068, under the condition that both of the third vectors and the fourth vectors meet a preset condition, the correlation matrix is obtained according to the third vectors and the fourth vectors.

Figure 4:
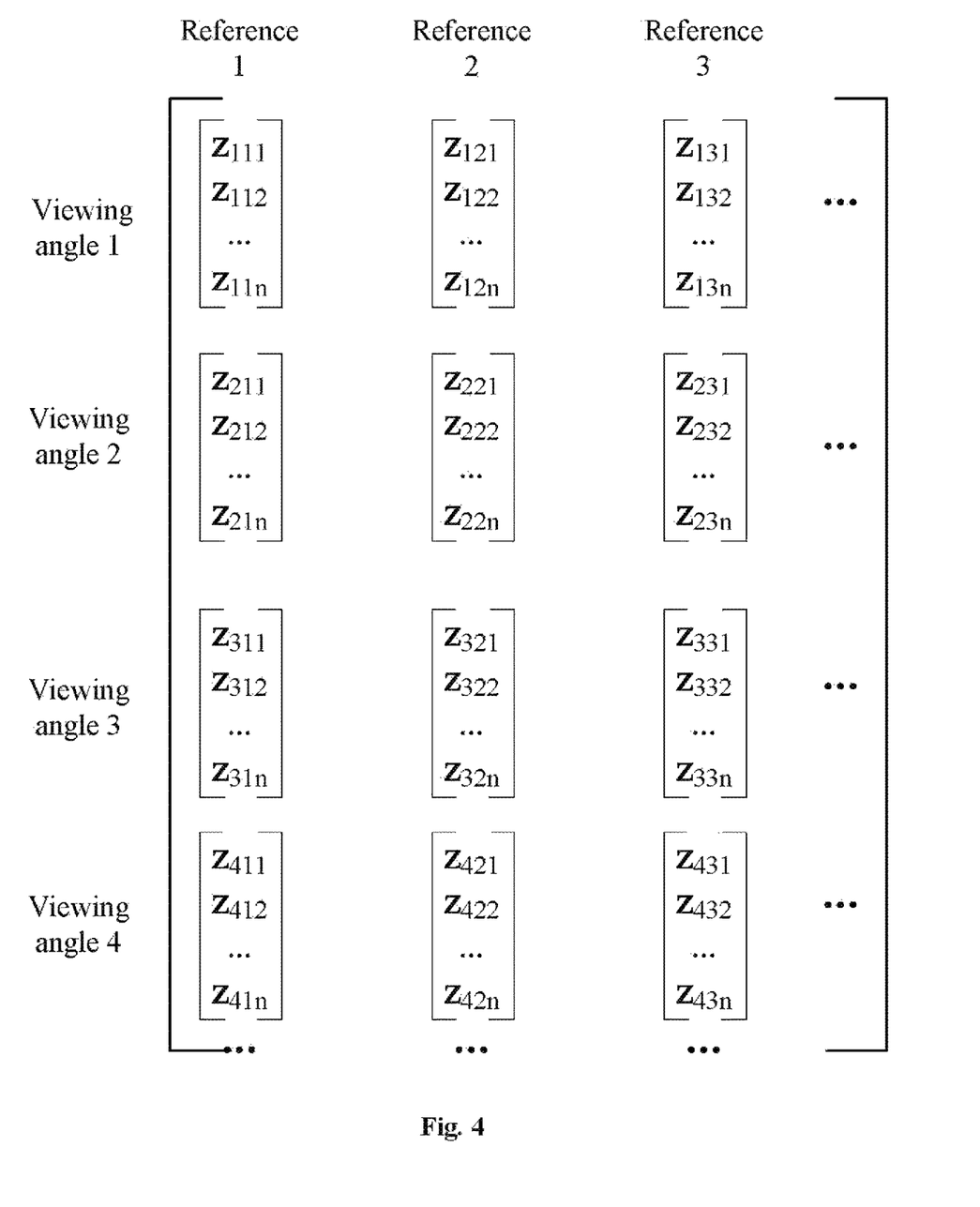
FIG. 4 is an optional schematic diagram of a characteristic matrix of multiple images to be detected according to an embodiment of the disclosure.

Specifically, singular value decomposition is performed on the obtained characteristic matrix Z shown in FIG. 4 at first, namely $Z=USV^T$, and first j rows of the matrix $V^T$ are extracted as initial values of the viewing angle vectors B, thereby obtaining the third vectors, that is, the third vectors are the viewing angle vectors B. Since the third vectors are orthogonal, the characteristic matrix Z is transformed to obtain:

$$[ZB^T]^{VT}=W^{VT}A,$$

where $[ZB^T]^{VT}$ is the first characteristic matrix. Singular value decomposition is performed on the matrix $[ZB]^{VT}$, namely $[ZB^T]^{VT}=USV^T$, and first i rows of $V^T$ are extracted as the reference vectors to further obtain the fourth vectors.

Similarly, since the reference vectors A are orthogonal, a matrix formula of the bilinear model may be transformed to obtain the second characteristic matrix, namely $[Z^{VT}A^T]^{VT}=WB$. Singular value decomposition is performed on the second characteristic matrix, namely $[Z^{VT}A^T]^{VT}=USV^T$, and the first j rows of $V^T$ are extracted as the viewing angle vectors B to further obtain the third vectors. The process is repeated till convergence of the obtained third vectors and fourth vectors. In such case, both of the third vectors and the fourth vectors meet the preset condition, and the correlation matrix W may be obtained according to the following formula:

$$W=[[ZB^T]^{VT}A^T]^{VT}.$$

Herein, under the condition that the third vectors and/or the fourth vectors do not meet the preset condition, the second characteristic matrix is determined as the characteristic matrix of the multiple images to be trained, and the step that the characteristic matrix of the multiple images to be trained is transformed according to the third vectors is executed until both of the third vectors and the fourth vectors meet the preset condition.

It is to be noted that, after the preset model is constructed, the image to be detected may be analyzed by use of the preset model. Under the condition that there are sufficient images in the preset model, the decomposed reference vectors and viewing angle vectors have certain universality, so that glint and/or gaze annotation data obtained according to the image data arranged in the preset model may be stored in the database. Herein, for the characteristic matrix z corresponding to the image to be detected, its corresponding reference vector and viewing angle vector may be found from the preset model, and in such case, the corresponding reference vector and viewing angle vector may directly be extracted from the database. When only one of the reference vector and viewing angle vector corresponding, to the image to be detected is stored in the database, the first vector and second vector of the image to be detected may be obtained according to the correlation matrix and the characteristic matrix of the image to be detected. Specifically, the image to be detected may be processed according to the following formulae to obtain the first vector and second vector of the image to be detected:

$$a=([Wb]^{VT})^{-1}z \text{ and}$$

$$b=([W^{VT}a]^{VT})^{-1}z$$

where W is the correlation matrix, z is the characteristic matrix of the image to be detected, a is the first vector, b is the second vector, $W^{VT}$ represents transposition processing of the correlation matrix W, $[Wb]^{VT}$ represents transposition processing of the matrix Wb, and $[W^{VT}a]^{VT}$ represents transposition processing of the matrix $W^{VT}a$.

In addition, it is also to be noted that the formulae are repeatedly iterated till convergence of both of the two formulae and the parameter of the image to be detected may be obtained according to the reference vector and viewing angle vector at this moment specifically by the following method.

In S1060, interpolation operation is performed on the first vector and the second vector according to the third vectors and the fourth vectors to obtain an calculation result.

In S1062, the position of the glint in the image to be detected and/or the gaze direction of the eyes in the image to be detected are/is determined according to the calculation result.

Specifically, linear representations of the reference vector a and the viewing angle vector b are obtained through the following formulae:

$$a=a_1n_1+a_2n_2+\ldots+a_sn_s, \text{ and}$$

$$b=b_1m_1+b_2m_2+\ldots+b_cm_c.$$

In the formulae, $a_j(0<j<s+1)$ represents the element in the fourth vectors (i.e., the reference vectors), $b_1(0<i<c+1)$ represents the element in the third vectors (i.e., the viewing angle vectors), $n_j(0<j<s+1)$ represents a linear combination coefficient of the vector a, and $m_1(0<i<c+1)$ represents a linear combination coefficient of the vector b.

After the linear combination coefficients of the reference vector and the viewing angle vector are obtained, interpolation operation may be performed on glint and/or gaze data in the database to obtain the following glint and/or gaze data of the image z to be detected:

$$X=X_1m_1+X_2m_2+\ldots+X_cm_c,$$

$$Y = Y_1 m_1 + Y_2 m_2 + \ldots + Y_c m_c,$$

$$gx = X(1)n_1 + X(2)n_2 + \ldots + X(s)n_s, \text{ and}$$

$$gy = Y(1)n_1 + Y(2)n_2 + \ldots + Y(s)n_s.$$

In the above formulae, $X_1, Y_1 (0 < i < c+1)$ represents a true value data vector corresponding to a gaze point of the reference space, $X(j), Y(j)(0 < j < s+1)$ represents a jth dimension of the vectors X and Y, and gx, gy represent coordinates of the gaze point respectively. Herein, under the condition that $X_1, Y_1 (0 < i < c+1)$ represents coordinates of the glint, gx, gy obtained according to the formulae represent the calculated coordinates of the glint respectively. A method for determining the gaze direction is the same as the method for determining the coordinates of the glint, and will not be elaborated herein.

Embodiment 2

Figure 5:
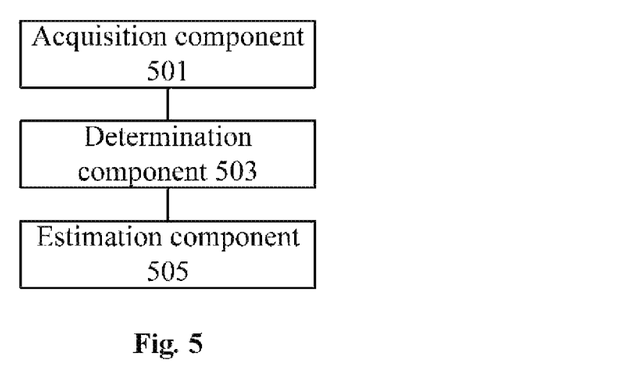
FIG. 5 is an optional structure diagram of a device for determining parameter for a gaze tracking device according to an embodiment of the disclosure.

According to the embodiment of the disclosure, a device for determining parameter for a gaze tracking device is also provided. Herein, FIG. 5 is a structure diagram of a device for determining parameter for a gaze tracking device according to an embodiment of the disclosure. As shown in FIG. 5, the device includes an acquisition component 501, a determination component 503 and an estimation component 505.

Herein, the acquisition component 501 is configured to acquire an image to be detected and a characteristic matrix of the image to be detected; the determination component 503 is configured to process the image to be detected according to a preset model to obtain a first vector and second vector of the image to be detected; and the estimation component 505 is configured to determine a parameter of the image to be detected according to the first vector and the second vector, the parameter of the image to be detected including at least one of: a position of a glint in the image to be detected and a gaze direction of eyes in the image to be detected.

It is to be noted that the acquisition component 501, the determination component 503 and the estimation component 505 correspondingly implement S102 to S106 in embodiment 1 and the three components implement an example and application scenario the same as those implemented by the corresponding steps but are not limited to the contents disclosed in embodiment 1.

In an optional embodiment, the device for determining parameter for the gaze tracking device further includes a first acquisition component, a processing component and a training component. Herein, the first acquisition component is configured to acquire multiple images to be trained; the processing component is configured to process the multiple images to be trained to obtain a characteristic matrix of the multiple images to be trained; and the training component is configured to train the characteristic matrix of the multiple images to be trained to obtain third vectors, fourth vectors and an correlation matrix.

It is to be noted that the first acquisition component, the processing component and the training component correspondingly implement S202 to S206 in embodiment 1 and the three components implement an example and application scenario the same as those implemented by the corresponding steps but are not limited to the contents disclosed in embodiment 1.

In an optional embodiment, the determination component includes a second determination component. Herein, the second determination component is configured to obtain the first vector and second vector of the image to be detected according to the correlation matrix and the characteristic matrix of the image to be detected.

In an optional embodiment, the estimation component includes a first processing component and a first determination component. Herein, the first processing component is configured to perform interpolation operation on the first vector and the second vector according to the third vectors and the fourth vectors to obtain an calculation result; and the first determination component is configured to determine the position of the glint in the image to be detected and/or the gaze direction of the eyes in the image to be detected according to the calculation result.

It is to be noted that the first processing component and the first determination component correspondingly implement S1060 to S1062 in embodiment 1 and the two components implement an example and application scenario the same as those implemented by the corresponding steps but are not limited to the contents disclosed in embodiment 1.

In an optional embodiment, the training component includes a second processing component, a third processing component, a fourth processing component, a fifth processing component and a sixth processing component. Herein, the second processing component is configured to decompose the characteristic matrix of the multiple images to be trained to obtain the third vectors; the third processing component is configured to transform the characteristic matrix of the multiple images to be trained according to the third vectors to obtain a first characteristic matrix; the fourth processing component is configured to decompose the first characteristic matrix to obtain the fourth vectors; the fifth processing component is configured to transform the first characteristic matrix according to the fourth vectors to obtain a second characteristic matrix; and the sixth processing component is configured to, under the condition that both of the third vectors and the fourth vectors meet a preset condition, obtain the correlation matrix according to the third vectors and the fourth vectors.

It is to be noted that the second processing component, the third processing component, the fourth processing component, the fifth processing component and the sixth processing component correspondingly implement S2060 to S2068 in embodiment 1 and the five components implement an example and application scenario the same as those implemented by the corresponding steps but are not limited to the contents disclosed in embodiment 1.

In an optional embodiment, the training component further includes a seventh processing component. Herein, the seventh processing component is configured to, under the condition that the third vectors and/or the fourth vectors do not meet the preset condition, determine the second characteristic matrix as the characteristic matrix of the multiple images to be trained and execute the step of transforming the characteristic matrix of the multiple images to be trained according to the third vectors until both of the third vectors and the fourth vectors meet the preset condition.

Embodiment 3

According to an embodiment of the disclosure, a storage medium is also provided, which includes a stored program, the program executing a method for determining parameter for a gaze tracking device in embodiment 1.

Each functional component provided in the embodiment of the disclosure may run in a device for determining parameter for a gaze tracking device or a similar arithmetic device, and may also be stored as a part of the storage medium.

Optionally, in the embodiment, a computer program is stored in the storage medium, and the computer program is configured to run to execute the method for determining parameter for the gaze tracking device.

Optionally, in the embodiment, the storage medium is configured to store the program code configured to execute the following steps: acquiring an image to be detected and a characteristic matrix of the image to be detected; processing the image to be detected according to a preset model to obtain a first vector and second vector of the image to be detected; and determining a parameter of the image to be detected according to the first vector and the second vector, the parameter of the image to be detected including at least one of: a position of a glint in the image to be detected and a gaze direction of eyes in the image to be detected.

Optionally, in the embodiment, the storage medium may further be configured to store a program code for each preferred or optional method step provided in the method for determining parameter for the gaze tracking device.

Embodiment 4

According to an embodiment of the disclosure, a processor is also provided, which is configured to run a program, the program running to execute a method for determining parameter for a gaze tracking device in embodiment 1.

In the embodiment of the disclosure, the processor may execute the running program for the method for determining parameter for the gaze tracking device.

Optionally, in the embodiment, the processor may be configured to execute the following steps: acquiring an image to be detected and a characteristic matrix of the image to be detected; processing the image to be detected according to a preset model to obtain a first vector and second vector of the image to be detected; and determining a parameter of the image to be detected according to the first vector and the second vector, the parameter of the image to be detected including at least one of: a position of a glint in the image to be detected and a gaze direction of eyes in the image to be detected.

The processor may run a software program and component stored in a memory, thereby executing various functional applications and data processing, namely implementing the method for determining parameter for the gaze tracking device.

Those of ordinary skill in the art can understand that all or part of the steps in each method in the abovementioned embodiment may be completed by hardware indicated through the program and related to a pupil position determination device, the program may be stored in a storage medium readable for the pupil position determination device, and the storage medium may include a flash disk, a Read-Only Memory (ROM), a Random Access Memory (RAM), a magnetic disk, an optical disk or the like.

The method and device for determining parameter for the gaze tracking device according to the disclosure are exemplarily described above with reference to the drawings. However, those skilled in the art should know that various improvements may further be made to the method and device for determining parameter disclosed in the disclosure for the gaze tracking device without departing from the contents of the disclosure. Therefore, the scope of protection of the disclosure should be determined by the contents of the appended claims.

Embodiment 5

According to an embodiment of the disclosure, a gaze tracking device is also provided, which includes a device for determining parameter for the gaze tracking device in embodiment 2.

The sequence numbers of the embodiments of the disclosure are only adopted for description and do not represent superiority-inferiority of the embodiments.

In the embodiments of the disclosure, the descriptions of the embodiments focus on different aspects. The part which is not described in a certain embodiment in detail may refer to the related description of the other embodiments.

In some embodiments provided in the disclosure, it should be understood that the disclosed technical contents may be implemented in other manners. Herein, the device embodiment described above is only schematic. For example, division of the units is only division of logical functions, and other division manners may be adopted during practical implementation. For example, multiple units or components may be combined or integrated to another system, or some features may be ignored or are not executed. In addition, shown or discussed coupling, direct coupling or communication connection may be implemented through indirect coupling or communication connection of some interfaces, units or components, and may be in an electrical form or other forms.

The units described as separate parts may or may not be separate physically, and parts displayed as units may or may not be physical units, that is, they may be located in the same place, or may also be distributed to multiple units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit. The integrated unit may be implemented in a hardware form and may also be implemented in form of software functional unit.

If being implemented in form of software functional unit and sold or used as an independent product, the integrated unit may be stored in a computer-readable storage medium. Based on such an understanding, the technical solutions of the disclosure substantially or parts making contributions to the conventional art or all or part of the technical solutions may be embodied in form of software product. The computer software product is stored in a storage medium, including a plurality of instructions configured to enable a computer device (which may be a personal computer, a server, a network device or the like) to execute all or part of the steps of the method in each embodiment of the disclosure. The storage medium includes various media capable of storing program codes such as a U disk, a ROM, a RAM, a mobile hard disk, a magnetic disk or an optical disk.

The above is only the preferred embodiment of the disclosure. It is to be pointed out that those of ordinary skill in the art may also make a number of improvements and embellishments without departing from the principle of the disclosure and these improvements and embellishments shall also fall within the scope of protection of the disclosure.

INDUSTRIAL APPLICABILITY

The solutions provided in the embodiments of the disclosure may be applied to gaze tracking. In a manner of separating and calculating image data to be detected, the technical problem of complex calculation of a gaze estimation algorithm and glint prediction algorithm for a gaze tracking device in the conventional art is solved, complexity of an image processing algorithm is reduced, and an operation speed for image processing is increased.

What is claimed is:

1. A method for determining parameter for a gaze tracking device, comprising:
   acquiring an image to be detected and a characteristic matrix of the image to be detected;
   processing the image to be detected according to a preset model to obtain a first vector and second vector of the image to be detected; and
   determining a parameter of the image to be detected according to the first vector and the second vector, the parameter of the image to be detected comprising at least one of: a position of a glint in the image to be detected and a gaze direction of eyes in the image to be detected;
   before processing the image to be detected according to the preset model, further comprising: acquiring multiple images to be trained; processing the multiple images to be trained to obtain a characteristic matrix of the multiple images to be trained; and training the characteristic matrix of the multiple images to be trained to obtain third vectors, fourth vectors and an correlation matrix;
   wherein training the characteristic matrix of the multiple images to be trained to obtain the third vectors, the fourth vectors and the correlation matrix comprises: decomposing the characteristic matrix of the multiple images to be trained to obtain the third vectors; transforming the characteristic matrix of the multiple images to be trained according to the third vectors to obtain a first characteristic matrix; decomposing the first characteristic matrix to obtain the fourth vectors; transforming the first characteristic matrix according to the fourth vectors to obtain a second characteristic matrix; and under the condition that both of the third vectors and the fourth vectors meet a preset condition, obtaining the correlation matrix according to the third vectors and the fourth vectors.

2. The method as claimed in claim 1, wherein processing the image to be detected according to the preset model to obtain the first vector and second vector of the image to be detected comprises:
   obtaining the first vector and second vector of the image to be detected according to the correlation matrix and the characteristic matrix of the image to be detected.

3. The method as claimed in claim 2, wherein determining the parameter of the image to be detected according to the first vector and the second vector comprises:
   performing interpolation operation on the first vector and the second vector according to the third vectors and the fourth vectors to obtain an calculation result; and
   determining the position of the glint in the image to be detected and/or the gaze direction of the eyes in the image to be detected according to the calculation result.

4. The method as claimed in claim 1, wherein, under the condition that the third vectors and/or the fourth vectors do not meet the preset condition, the second characteristic matrix is determined as the characteristic matrix of the multiple images to be trained and the step of transforming the characteristic matrix of the multiple images to be trained according to the third vectors is executed until both of the third vectors and the fourth vectors meet the preset condition.

5. The method as claimed in claim 1, wherein the first vector is a vector in reference vectors, and the second vector is a vector in viewing angle vectors.

6. A device for determining parameter for a gaze tracking device, comprising at least one processor; and a computer readable storage, coupled to the at least one processor and storing at least one computer executable instructions thereon, which when the at least one computer executable instructions is executed by the at least one processor, cause the at least one processor to carry out following actions:
   acquiring an image to be detected and a characteristic matrix of the image to be detected;
   processing the image to be detected according to a preset model to obtain a first vector and second vector of the image to be detected; and
   determining a parameter of the image to be detected according to the first vector and the second vector, the parameter of the image to be detected comprising at least one of: a position of a glint in the image to be detected and a gaze direction of eyes in the image to be detected;
   acquiring multiple images to be trained; processing the multiple images to be trained to obtain a characteristic matrix of the multiple images to be trained; and training the characteristic matrix of the multiple images to be trained to obtain third vectors, fourth vectors and an correlation matrix;
   wherein training the characteristic matrix of the multiple images to be trained to obtain the third vectors, the fourth vectors and the correlation matrix comprises: decomposing the characteristic matrix of the multiple images to be trained to obtain the third vectors; transforming the characteristic matrix of the multiple images to be trained according to the third vectors to obtain a first characteristic matrix; decomposing the first characteristic matrix to obtain the fourth vectors; transforming the first characteristic matrix according to the fourth vectors to obtain a second characteristic matrix; and under the condition that both of the third vectors and the fourth vectors meet a preset condition, obtain the correlation matrix according to the third vectors and the fourth vectors.

7. The device as claimed in claim 6, wherein processing the image to be detected according to the preset model to obtain the first vector and second vector of the image to be detected comprises:
   obtaining the first vector and second vector of the image to be detected according to the correlation matrix and the characteristic matrix of the image to be detected.

8. The device as claimed in claim 7, wherein determining the parameter of the image to be detected according to the first vector and the second vector comprises:
   performing interpolation operation on the first vector and the second vector according to the third vectors and the fourth vectors to obtain an calculation result; and
   determining the position of the glint in the image to be detected and/or the gaze direction of the eyes in the image to be detected according to the calculation result.

9. The device as claimed in claim 6, wherein under the condition that the third vectors and/or the fourth vectors do not meet the preset condition, determining the second characteristic matrix as the characteristic matrix of the multiple images to be trained and execute the step of transforming the characteristic matrix of the multiple images to be trained according to the third vectors until both of the third vectors and the fourth vectors meet the preset condition.

10. The device as claimed in claim 6, wherein the first vector is a vector in reference vectors, and the second vector is a vector in viewing angle vectors.

11. A non-transitory storage medium, comprising a stored program, the program executing the following instruction:
   acquiring an image to be detected and a characteristic matrix of the image to be detected;
   processing the image to be detected according to a preset model to obtain a first vector and second vector of the image to be detected; and
   determining a parameter of the image to be detected according to the first vector and the second vector, the parameter of the image to be detected comprising at least one of: a position of a glint in the image to be detected and a gaze direction of eyes in the image to be detected;
   the program before processing the image to be detected according to the preset model, further comprising: acquiring multiple images to be trained; processing the multiple images to be trained to obtain a characteristic matrix of the multiple images to be trained; and training the characteristic matrix of the multiple images to be trained to obtain third vectors, fourth vectors and a correlation matrix;
   wherein training the characteristic matrix of the multiple images to be trained to obtain the third vectors, the fourth vectors and the correlation matrix comprises: decomposing the characteristic matrix of the multiple images to be trained to obtain the third vectors; transforming the characteristic matrix of the multiple images to be trained according to the third vectors to obtain a first characteristic matrix; decomposing the first characteristic matrix to obtain the fourth vectors; transforming the first characteristic matrix according to the fourth vectors to obtain a second characteristic matrix; and under the condition that both of the third vectors and the fourth vectors meet a preset condition, obtaining the correlation matrix according to the third vectors and the fourth vectors.

12. The non-transitory storage medium as claimed in claim 11, wherein processing the image to be detected according to the preset model to obtain the first vector and second vector of the image to be detected comprises:
   obtaining the first vector and second vector of the image to be detected according to the correlation matrix and the characteristic matrix of the image to be detected.

13. The non-transitory storage medium as claimed in claim 12, wherein determining the parameter of the image to be detected according to the first vector and the second vector comprises:
   performing interpolation operation on the first vector and the second vector according to the third vectors and the fourth vectors to obtain an calculation result; and
   determining the position of the glint in the image to be detected and/or the gaze direction of the eyes in the image to be detected according to the calculation result.

14. The non-transitory storage medium as claimed in claim 12, wherein, under the condition that the third vectors and/or the fourth vectors do not meet the preset condition, the second characteristic matrix is determined as the characteristic matrix of the multiple images to be trained and the step of transforming the characteristic matrix of the multiple images to be trained according to the third vectors is executed until both of the third vectors and the fourth vectors meet the preset condition.

* * * * *